United States Patent [19]

Balbachan

[11] Patent Number: 5,783,945

[45] Date of Patent: Jul. 21, 1998

[54] EARTHQUAKE FORECAST METHOD AND APPARATUS WITH MEASUREMENT OF ELECTRICAL, TEMPERATURE AND HUMIDITY PARAMETERS OF SOIL

[76] Inventor: Michail Balbachan, 5 Sherbakovskaya Street., Apt. 10, Moscow, Russian Federation, 105318

[21] Appl. No.: 736,136

[22] Filed: Oct. 24, 1996

[51] Int. Cl.⁶ .............................. G01V 3/08; G01V 3/38; G01V 1/00; G08C 17/00
[52] U.S. Cl. .......................... 324/348; 324/72; 340/539; 340/690; 364/420
[58] Field of Search .................... 324/323, 344, 324/345, 348–350, 457, 72; 340/539, 601, 602, 690; 364/420, 421

[56] References Cited

U.S. PATENT DOCUMENTS

| | | | |
|---|---|---|---|
| 2,996,657 | 8/1961 | Varian | 324/345 X |
| 4,396,149 | 8/1983 | Hirsch | |
| 4,628,299 | 12/1986 | Tate et al. | 340/690 X |
| 4,825,165 | 4/1989 | Helms et al. | 324/348 X |
| 4,835,473 | 5/1989 | Bostick, Jr. | 324/350 X |
| 4,884,030 | 11/1989 | Naville et al. | 324/348 X |
| 5,521,508 | 5/1996 | Merzer | 324/344 X |
| 5,585,558 | 12/1996 | Zhelonkin et al. | |

*Primary Examiner*—Gerard R. Strecker
*Attorney, Agent, or Firm*—Boris G. Tankhilevich

[57] ABSTRACT

An apparatus and a method for predicting an earthquake are disclosed. The apparatus employs a set of two electrodes for measuring the vertical component of the gradient of the electrical field due to the capillary movement and the surface evaporation of the ground water, a humidity sensor for measuring the humidity of the soil surface, and a temperature sensor for measuring the temperature of the soil surface. The correlation coefficient between the changes in the electrical field gradient due to changes in the surface temperature related to the water evaporation from the soil surface is calculated. The correlation coefficient changes its sign at the time of appearance of the earthquake precursor.

16 Claims, 5 Drawing Sheets

ELTER-1/TANK-125
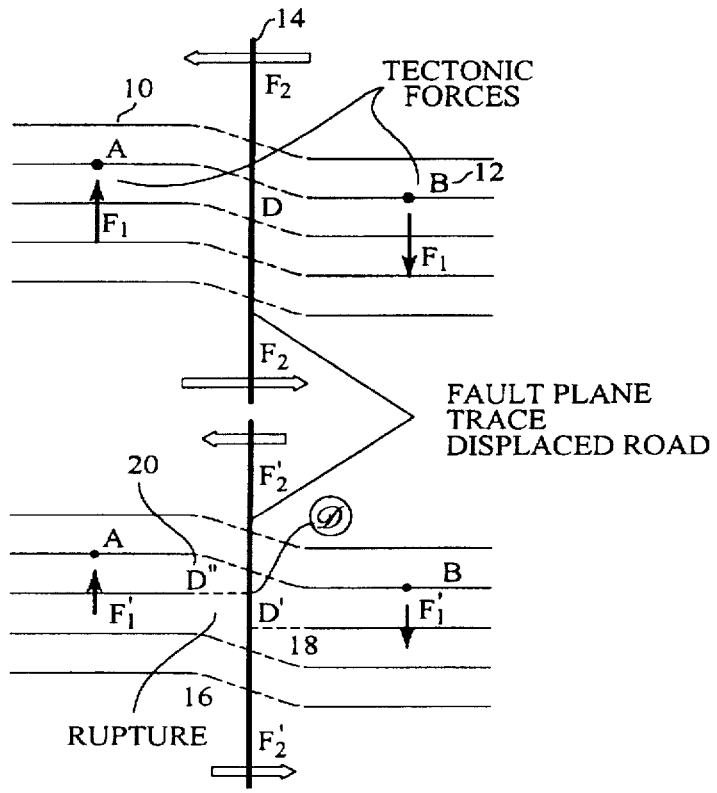
*Fig.* 1A
*Fig.* 1B
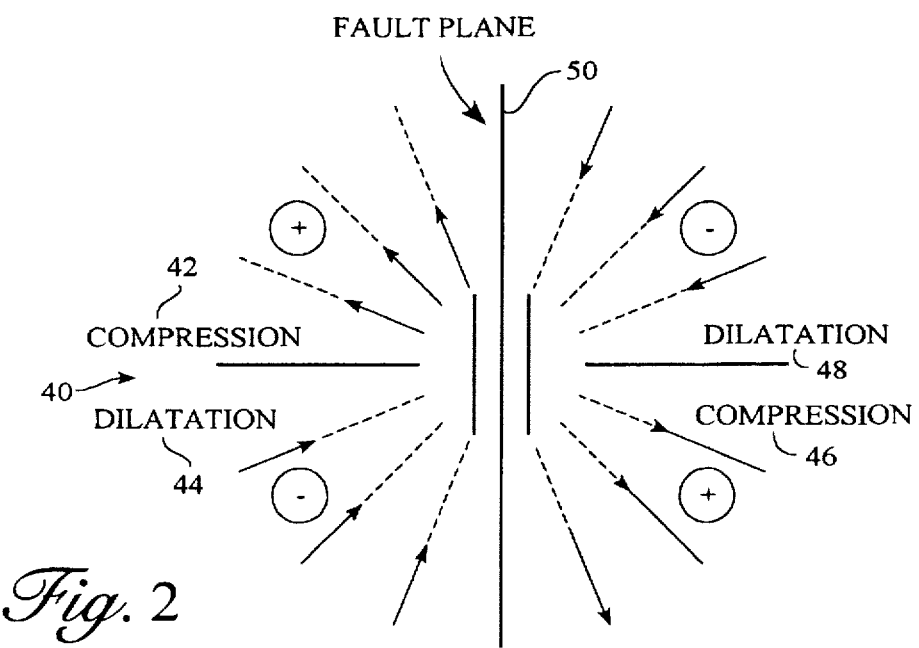
*Fig.* 2

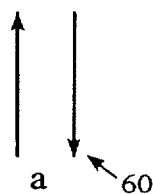
*Fig.* 3A
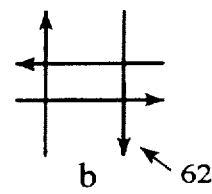
*Fig.* 3B
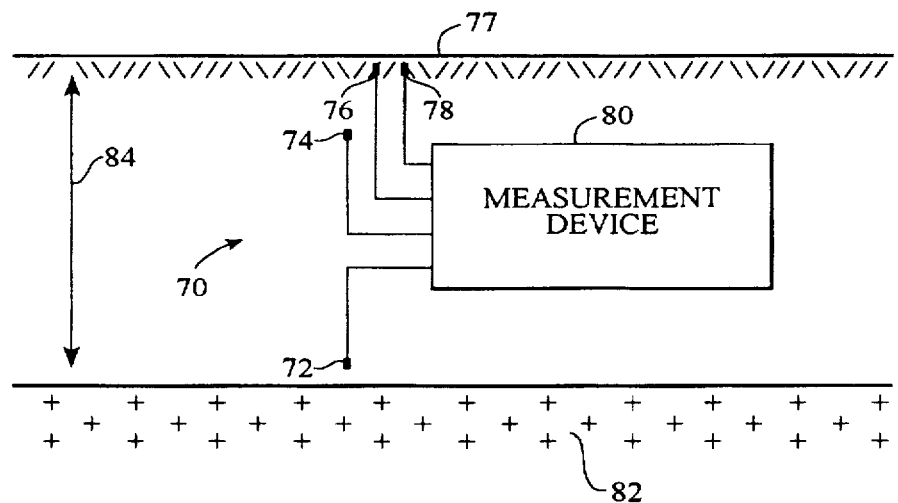
*Fig.* 4
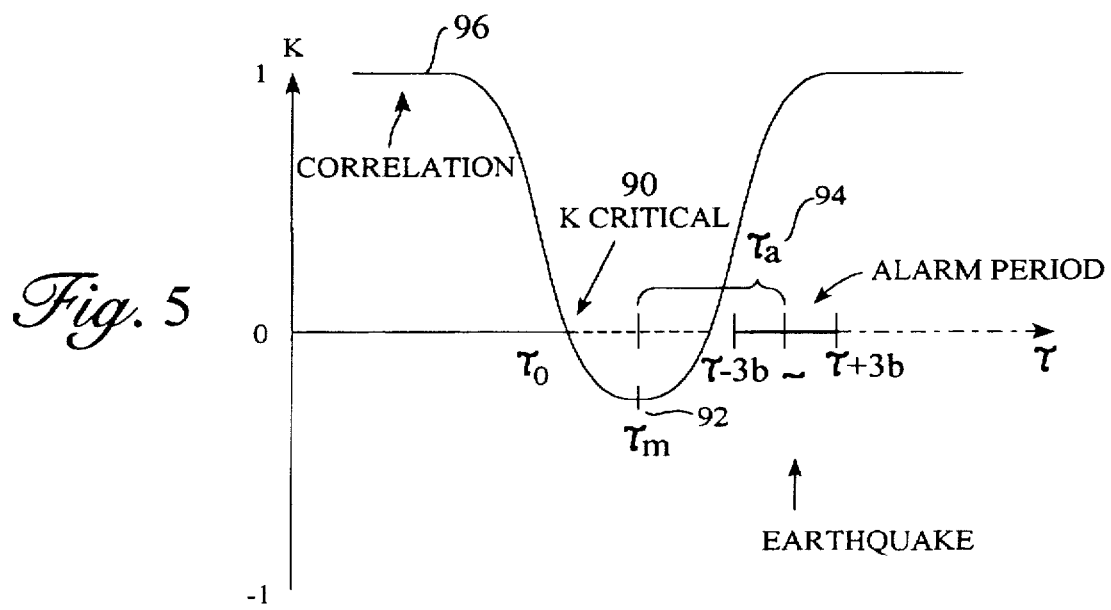
*Fig.* 5

EARTHQUAKE FORECAST METHOD AND APPARATUS WITH MEASUREMENT OF ELECTRICAL, TEMPERATURE AND HUMIDITY PARAMETERS OF SOIL

BACKGROUND

Many techniques have been proposed for predicting earthquakes, ranging in sophistication from measurement of tectonic activity to observation of insect and other animals' behavior patterns. Although some success has been reported, these techniques have not been demonstrated to yield a reliable indication of an impending earthquake, let alone accurately to forecast the magnitude, time of occurrence and epicenter.

In U.S. Pat. No. 4,612,506 issued to Varotsos et al., a method of forecasting earthquakes as a function of transient variation in electric earth currents and an apparatus for practicing such a method are disclosed. Transient variations in earth currents are detected from electrodes buried in the earth and portions of the transient variations within preselected frequency ranges are selected. The amplitude of such portions are then compared to predetermined standards for predicting the magnitude, location and time of occurrence of an impending earthquake. However, the Varotsos method has a relatively low reliability of about 9%.

Laukien described in U.S. Pat. No. 5,270,649 another method and apparatus for predicting earthquakes. The invention suggests to measure continuously a physical parameter of the earth's crust by means of magnetic spin resonance measurements to develop an alarm signal. When the value of the alarm signal exceeds a threshold value, an alarm is generated.

In U.S. Pat. No. 5,387,869 issued to Enomoto, an apparatus for measuring transient earth current to predict the occurrence of an earthquake is disclosed. The apparatus includes a detection electrode and a second electrode disposed beneath the surface of the earth in vertical alignment with one another at depths greater than those to which electromagnetic waves generated above the surface of the earth having commercial power line frequencies penetrate. The electrical resistance measured between the detection electrode and the second electrode is on the order of several tens of thousands of ohms. A charge detector detects only high frequency components of a current flowing between the detection electrode and the second electrode. On the basis of these detected high frequency components, the likelihood of an occurrence of an earthquake may be determined.

In all these methods only the electrical parameters of the soil are measured. With the help of these methods it is impossible to definitely distinguish the electric fields related to the tectonic deformations in the rock massif, from the electric fields of any other nature.

What is needed is to monitor the changes of rock deformations, preceding the earthquake. To achieve this, one should simultaneously measure the electric and other physical changes in the rocks, so that the massif's tectonic deformation effects are immediately detected.

SUMMARY OF THE INVENTION

The present invention is unique because it discloses a method and an apparatus for determining the true pattern of the precursors of the forthcoming earthquake by measuring the temperature and humidity changes of the soil together with measurements of the changes of electrical fields in the soil.

One aspect of the present invention is directed to an apparatus for predicting an earthquake. The apparatus comprises: (1) a sensing circuit for measuring the parameters of soil and for generating a sensing signal; (2) a processing circuit for receiving the sensing signal, for processing the sensing signal, and for generating a prediction signal (PS); (3) a receiving circuit for receiving a command signal from a central station to initiate the transmission of the PS signal; and (4) a transmitting circuit conductively connected to the processing circuit for transmitting the PS signal to the central station and to a data processing center.

In the preferred embodiment, the sensing circuit further includes: (1) a water humidity sensor for monitoring the changes in soil humidity W; (2) a temperature sensor for measuring the temperature $T_s$ of the soil surface; and (3) a pair of electrodes for measuring the vertical component $U_h$ of the electrical field gradient associated with the mechanical movement of the soil water. A first electrode is located at a certain depth $h_0$ beneath an earth surface, wherein the depth $h_0$ is determined by the depth of the quartz containing hard rock layer. A second electrode is located beneath an earth surface at a certain depth $h_1$ substantially close to the earth surface. One can measure the correlation factor K between the changes in the vertical component of the electrical field gradient $U_h$ and the changes in the soil temperature $T_s$ due to the electrokinetical effect associated with the vertical movement of the soil water when the soil water evaporates at the earth surface level.

In one embodiment, the first electrode is located at the depth $h_0$ substantially equal to 1 meter beneath an earth surface, and the second electrode is located at the depth $h_1$ substantially equal to (0.1–0.3) meters beneath an earth surface.

In the preferred embodiment, the first and the second electrodes comprise a semiconductive element with substantially large electrical capacity. In one embodiment, the first electrode and the second electrode comprise an organic semiconductor. In another embodiment, the first electrode and the second electrode comprise an organic semiconductor polyanilin.

In the preferred embodiment, the processing circuit further comprises: (1) a measurement and control circuit for receiving the sensing signal, for processing the sensing signal, and for generating a prediction signal (PS) to be transmitted; and (2) a battery circuit for supplying energy to the measurement and control circuit.

In one embodiment, the battery circuit further includes: (1) a solar panel being exposed to the light intensity for transforming the light energy into an electrical energy; and (2) a storage battery for storing the electrical energy generated by the solar panel and for supplying the processing circuit with electrical energy.

Another aspect of the present invention is directed to a network of measurement stations for earthquake prediction. The network comprises: (1) a central station for generating a command signal and receiving control signals; (2) a plurality of measurement stations, each station generating an earthquake prediction signal PS at the place of the station location; and (3) a data processing center connected to the central station for processing each prediction signal PS generated by each measurement station and for determination of the epicenter location, the magnitude, and the time of occurrence of the forthcoming earthquake. Each measurement station includes an apparatus comprising: (1) a sensing circuit for measuring the parameters of soil and for generating a sensing signal; (2) a processing circuit for receiving the sensing signal, for processing the sensing signal, and for generating a prediction signal (PS); (3) a receiving circuit for receiving the command signal from the central station to initiate the transmission of the PS signal; and (4) a transmitting circuit for transmitting the PS signal to the central station.

In the preferred embodiment, the network of measurement stations further comprises: at least five measurement stations for generating at least five earthquake prediction signals for defining the epicenter location of the forthcoming earthquake.

Yet, one more aspect of the present invention is directed to a method of forecasting earthquakes as a function of correlation K between the vertical component of the electrical field gradient $U_h$ and the changes in the temperature of the soil surface $T_s$. The method comprises the following steps: (a) positioning a pair of electrodes beneath the earth surface at a first position $P_1$ with coordinates $(X_1, Y_1, Z_1)$ for measuring the vertical component $U_h$ of the electrical field gradient associated with the mechanical movement of the soil water, the first electrode being located at a certain depth $h_0$ beneath an earth surface, wherein the depth $h_0$ is determined as the depth of the quartz containing hard rock layer, and the second electrode being located beneath an earth surface at a certain depth $h_1$ substantially close to an earth surface; (b) positioning a temperature sensor at the soil surface at the position $P_1$ for measuring the changes in temperature $T_s$ of the soil surface; (c) calculating a correlation factor $K_1$ between variation of the vertical component of the electrical field gradient $U_h$ and variation of the changes in the temperature of the soil $T_s$ due to the electrokinetical effect associated with the vertical movement of the soil water when the soil water evaporates at the earth surface level for the first position $P_1$; (d) positioning a water humidity sensor at the earth surface at the position $P_1$ for monitoring the soil humidity content $W_1$ in order to filter out variation of the correlation factor $K_1$ due to changes of the soil humidity associated with the non-earthquake factors; (e) calculating a forecast parameter $F_1(K_1, \tau)$ for the position $P_1$ (as a function of $K_1$ and $\tau$) by summing the filtered variations of the correlation factor $K_1$ over time $\tau$ starting at the time moment $\tau=\tau_1$ when $K_1$ starts to become negative and ending at the time moment $\tau=\tau_{m1}$ when $K_1$ reaches the minimum; (f) calculating parameters $B_1$ and $A_1$ for the position $P_1$, by averaging the forecast parameter $F_1$ over substantial number of prior earthquakes that occurred at position $P_1$, wherein parameter $B_1$ is related to a location of the epicenter of a forthcoming earthquake, and wherein $A_1$ is related to the physical properties of the local place of position $P_1$; (g) repeating the steps (a)–(f) for calculating (n) correlation factors $(K_1, K_2, \ldots K_n)$, and (n) forecast parameters $(F_1(K_1, \tau), F_2(K_2, \tau), \ldots F_n(K_n, \tau))$, and parameters $(A_1, A_2, \ldots A_n; B_1, B_2, \ldots B_n)$ for (n) positions $P_1, P_2, \ldots P_n$, n being an integer; and (h) predicting the time of occurrence, magnitude, and epicenter of the forthcoming earthquake by using 'n' values $(F_1(K_1, \tau), F_2(K_2, \tau), \ldots F_n(K_n, \tau))$ of the forecast parameters extrapolated for large earthquake magnitudes.

In the preferred embodiment, the step of predicting the time of occurrence of the forthcoming earthquake further includes the substeps of: (1) calculating the average correlation factor $<K>$; (2) calculating the average period of time $\tau_a$ between the moment of time $\tau_m$ when the average correlation factor $<K>$ has its minimum and the start of the earthquake; (3) calculating the function $\tau_a$ (d); and (4) extrapolating the dependance $\tau_a(d)$ for large d that corresponds to earthquakes with the large magnitudes, wherein $\tau_a(d\rightarrow\infty)$ is the time of occurrence of a forthcoming earthquake.

BRIEF DESCRIPTION OF THE DRAWINGS

FIG. 1A illustrates tectonic forces at the ground.

FIG. 1B shows a rupture at point D at the ground surface.

FIG. 2 is a plane view of a quadrantal pattern of compressions and dilatations generated after a strike of fault plane.

FIG. 3A is a depiction of a dipole model for an elastic energy stored in an earthquake.

FIG. 3B shows a double dipole model for an elastic energy stored in an earthquake.

FIG. 4 is a depiction of a model used for forecasting an earthquake including a layer of quartz containing rock situated close to the earth's surface, and including an apparatus having two electrodes for measuring the vertical component of the gradient of electrical field, and including temperature and humidity sensors.

FIG. 5 illustrates the dependence of the correlation factor K on the time $\tau$ of the impending earthquake $K(\tau)$.

FULL DESCRIPTION OF THE PREFERRED EMBODIMENT

Figure 6:
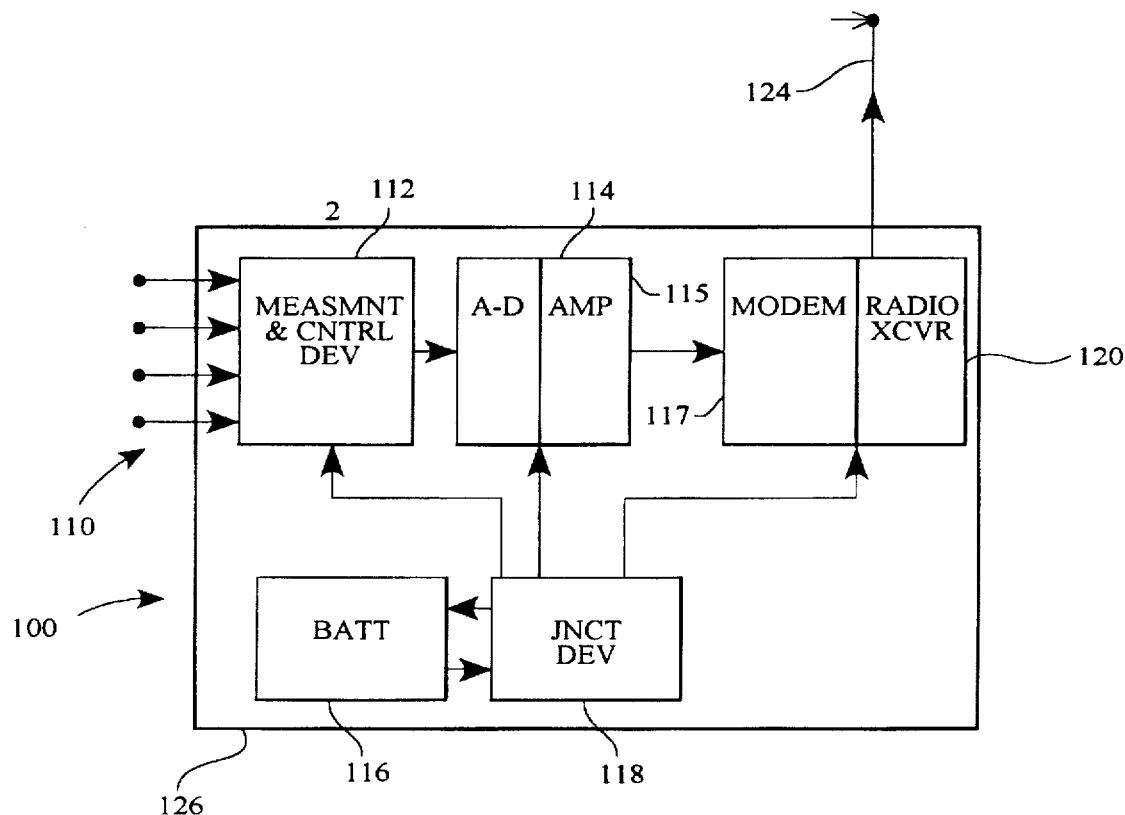
FIG. 6 is a depiction of a measurement station.

The earthquake produces abrupt changes in structure of the rocks. The offsets of geological structure are called faults. FIG. 1A illustrates how in a response to the action of tectonic forces that produce an earthquake, points A (10) and B (12) move in opposite directions, bending the lines across the fault (14). FIG. 1B shows how rupture occurs at point D (16), and strained rocks on each side of the fault spring back to D' (18) and D" (20). This elastic rebound is believed to be the immediate cause of earthquakes. The more the crustal rocks are elastically strained, the more energy they store.

FIG. 2 depicts the areas of compression (42, 46) and dilatation (44, 48) in structure of the rocks corresponding to points A and B of FIG. 1A.

There are two basic models for mathematical description of the elastic energy stored in an earthquake. FIG. 3A is a depiction of a dipole model (60) for an elastic energy stored in an earthquake, whereas FIG. 3B shows a double dipole model (62) for an elastic energy stored in an earthquake. Usually the following formula for the energy of an earthquake is used:

$$E=10^d; \tag{1}$$

wherein d is the energy class of an earthquake.

There is also a relationship between the magnitude (m) of an earthquake on Richter scale and the energy class (d) of the earthquake:

$$\log E = 5.24 + 1.44\, m. \tag{2}$$

In this model of the earthquake, one can explain the occurrence of the precursor of the earthquake. The tectonic processes which lead to the eruption of an earthquake always proceed with changes in the vicinity of the earth's crust. These changes manifest themselves typically as pressure changes and changes in the chemical composition of the water of the earth's crust. The change in the chemical composition of the water of the earth's crust can be either an indirect consequence of the change in pressure or a direct consequence of chemical processes.

Almost everywhere the rocks are permeated by ground water. This water saturates the rocks and fills up the cracks and pores within them.

As shown in FIG. 4, the disclosed method for predicting an earthquake assumes the existence of the piezoelectric minerals like quartz (82) separated from the surface of the earth by the narrow layer (about 1 meter) (84) of the brittle rocks. The ground water saturates the rocks and fills up the cracks and pores within them. The ground water after reaching the earth surface naturally evaporates. In accordance with the present invention, it has been discovered that during the natural water evaporation from the surface of the earth, the vertical electrical field ($U_h$) is formed in the soil because this capillary effect causes the ground water to have the number of positive ions in excess of the number of negative ions. This is explained by the fact that when water contacts hard minerals, double electrical layers are formed which are positively charged at the water side.

The intensity of the ground water evaporation is determined by the earth's surface temperature $T_s$. Thus, there is a correlation K between the changes in the vertical component of the gradient of the electrical field $U_h$ associated with the ground water evaporation, and the changes in the earth's surface temperature $T_s$. As was indicated above, in the absence of earthquake there is a surplus part C of positive ions in the ground water. Therefore, the correlation factor K is positive.

The positive correlation K means that the more evaporation of the ground water from the earth surface takes place, the stronger is the vertical component of the gradient of electrical field $U_h$. However, the evaporation from the earth's surface is decreased if there is an increased humidity of the air due to rain or due to any other source of increased humidity. During periods of rain, the W sensor data sharply changes from its normal condition value to a value affected by the rain. Thus, it is important to continuously monitor the humidity of the earth surface W to take care of this problem.

The elastic deformation of the rocks during the earthquake preparation causes the redistribution of the ions between the ground water in the area (84 of FIG. 4), between the layer of quartz containing rock (82) and the earth's surface. The redistribution of ions is related to the piezoelectric effect in the layer of quartz. Indeed, the piezoelectrical effect leads to such an ion concentration redistribution in the double electrical layers at the border where water contacts quartz, that some amount of the negatively charged ions leaves the quartz containing volume. The effect is proportional to the deformation speed. Therefore, the correlation factor K becomes negative. The maximum amount of the charge redistribution in the diffused ground water occurs when the ground water changes its polarity from plus to minus. If this is the case, the correlation factor K becomes close to minus one. This corresponds to the maximum of the velocity of pressure and to the maximum of the piezoelectric effect in the layer of quartz (82) associated with the earthquake preparation. Thus, the correlation parameter K is a function of time $\tau$ between the present moment and the time of the occurrence of the impending earthquake: $K(\tau)$. It is also clear that the deformation of the quartz minerals is used to store the elastic energy released by an impending earthquake, and therefore can be used to predict the forthcoming earthquake.

One can calculate the forecast parameter F which is proportional to the quartz rocks deformation energy as follows:

$$F = \int_{\tau = \tau 0}^{\tau = \tau m} [K_o - K(\tau)] d\tau; \quad (3)$$

wherein:

$\tau_0$ is a moment of time (90 of FIG. 5) when the correlation factor K starts the move to change its polarity;

$\tau_m$ is a moment of time (92 of FIG. 5) when the correlation factor K reaches its minimum value;

$\tau_a$ is a time period (94 of FIG. 5) between the moment of time $\tau_m$ when the correlation factor K reaches its minimum value and the commencement of earthquake itself; and $K_o$ is a "noise" value of K associated with non-earthquake factors like rains, etc.

If the earthquake is a strong one, the K factor can be approximated as follows:

$$K = U_h/T_s - C = \alpha N; \quad (4)$$

wherein $\alpha$ is a numerical parameter, and C is a concentration of the surplus part of ions in the ground water.

If the earthquake is not a strong one, there is an empirical statistical technique to calculate the correlation coefficient K:

$$K = [1/Sx * Sy(n-1)] * \sum_{i=1}^{n} (x_i - \hat{x}) * (y_i - \hat{y}); \quad (5)$$

wherein:

$$\hat{x} = (1/n) \sum_{i=1}^{n} x_i; \quad (6)$$

$$\hat{y} = (1/n) \sum_{i=1}^{n} y_i; \quad (7)$$

$$(Sx)^2 = [1/(n-1)] * \sum_{i=1}^{n} (x_i - \hat{x})^2; \quad (8)$$

$$(Sy)^2 = [1/(n-1)] * \sum_{i=1}^{n} (y_i - \hat{y})^2; \quad (9)$$

Here, variable x can approximate the time dependence of the vertical component of the gradient of electrical field $U_h(\tau)$, and variable y can approximate the time dependence of the soil temperature $T_s(\tau)$.

Using representations (4–7) for coefficient of correlation K, and using the representation (1) for the elastic energy of quartz deformation associated with an impending earthquake, one can obtain the forecast parameter F as follows:

$$F = A * 10^d / r^B; \quad (10)$$

wherein:

A is an empirical constant associated with the place of measurement;

B is an empirical constant that depends on the specificity of the elastic energy release by an earthquake, and 'd' is an energy class of an earthquake related to the magnitude of an earthquake (see formula (2) and discussion above).

Figure 9:
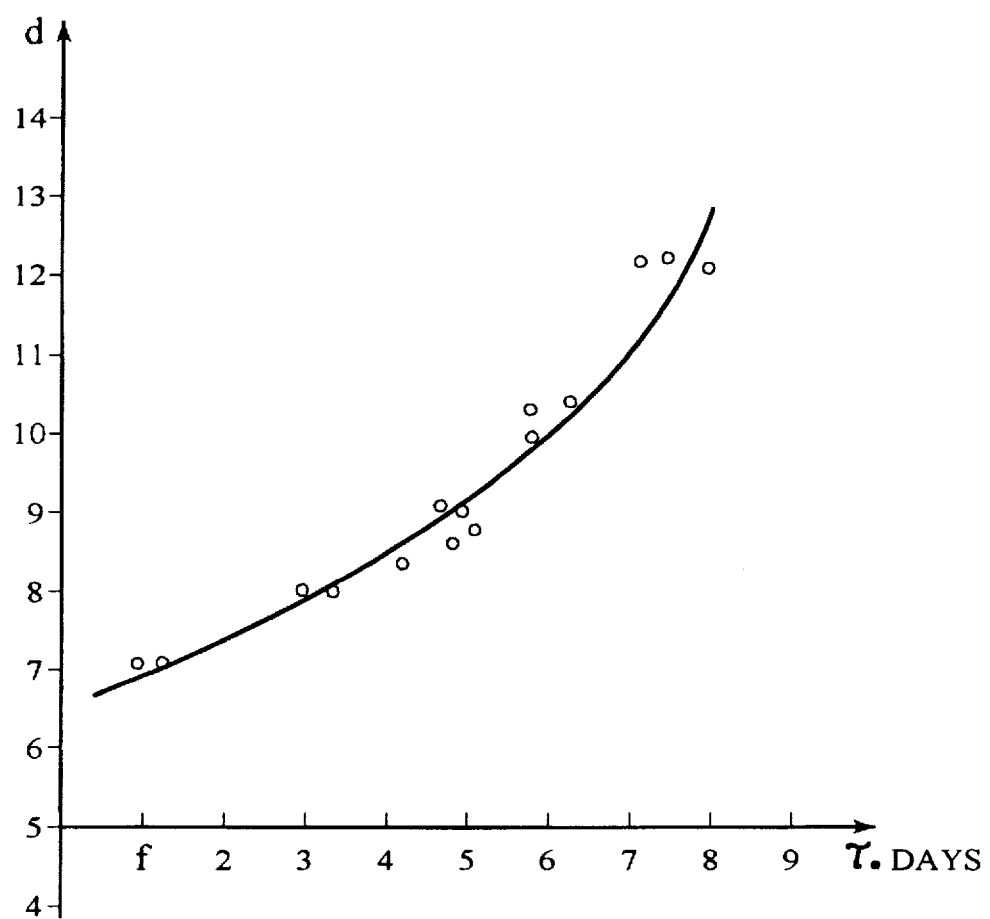
FIG. 9 depicts the experimental dependence of the period of time $\tau_a$ between the minimum of the coefficient of correlation K and the commencement of an earthquake having the energy class 'd'.

It is understood that for the larger accumulation of the elastic energy released by an earthquake (large d), the larger period of time is necessary (see empirical curve of FIG. 9).

FIG. 4 illustrates the preferred embodiment (70) of the present invention. The electrode 74 is buried underneath the earth surface (77) at the depth of 0.1–0.3 meters, the electrode 72 is located close to the layer of quartz 82 at the depth of approximately one meter. The temperature (76) and the humidity (78) sensors of the measurement station (80) are located at the earth's surface.

In the preferred embodiment, the electrodes 74 and 72 comprise material including an organic semiconductor. For the complete reference, please, see filed on the same day as the current patent application the U.S. patent application Ser. No. 736,134 (the patent application Ser. No. 736,134 is incorporated by reference herein) that discloses the architecture of the electrodes 74 and 72 of the present invention.

FIG. 6 is a depiction of a measurement station (100) comprising several elements including a set of temperature and humidity sensors and two electrodes (110). A humidity sensor continuously monitors the soil humidity content W. A temperature sensor measures the changes in the temperature $T_s$ of the soil. A pair of electrodes is used for measuring the vertical component $U_h$ of the electrical field gradient associated with the mechanical movement of the soil water.

In the preferred embodiment, the first and the second electrodes should be located at certain depths $h_0$ and $h_1$ beneath the earth surface. The depth $h_0$ is determined by the mineral composition of the soil (see also 74 and 72 of FIG. 4). The depth $h_0$ is approximately equal to 1 meter beneath the earth surface, and the second electrode should be located beneath the earth surface at depth $h_1$ approximately equal to (0.1–0.3) meters.

The measurement station (100) of FIG. 6 should be placed in a water-proof box (126). The measurement station (100) comprises a measurement and control device (112) for detecting the changes in the soil associated with an incoming earthquake, for storing the analog data, for an A/D conversion of the analog data, and for operation of other devices.

In one embodiment, the A/D converter (114) is connected to the measurement and control device 112 for converting the analog APS signal into a digital prediction signal (DPS). This DPS signal has power of about 1–2 watts. This DPS power is not sufficient, so the measurement station further includes an amplifier (115) for amplifying the digital prediction signal (DPS). In one embodiment, the amplifier (115) comprises a high power amplifier (HPA) for amplifying the DPS signal to 10 watts. The amplifier that is fit for these purposes is manufactured by "Maxon Europe Ltd.", Hampstead, UK, HP2.7E6.

A modem (117) is connected to the amplifier (115) for modulating the amplified DPS signal by an intermediate frequency (IF) carrier. A radio transceiver (120) is connected to the modem (117) for modulating the IF DPS signal by a radio frequency (RF) carrier. It also transmits the RF DPS signal to the central station or to another measurement station by means of radio waves.

The transceiver 120 can also act as a receiving device that can be used for receiving a command signal from a central station to initiate the transmission of the earthquake prediction signal (PS). This command signal triggers the functioning of the measurement station. A battery (116) is connected to the modem, to the measurement and control device, and to the amplifier for supplying energy each of these devices.

In the preferred embodiment, the battery (116) further includes a solar panel being exposed to the light intensity for transforming the light energy into an electrical energy; and a storage battery for storing the electrical energy generated by the solar panel and for supplying the measurement station with the electrical energy.

The measurement station (100) also includes a feeding and junction device (118) for routing a functional control signal received from the central station and for monitoring the overall performance of the measurement station.

In one embodiment, the antenna (124) should have enough gain to compensate for atmospheric losses.

Figure 7:
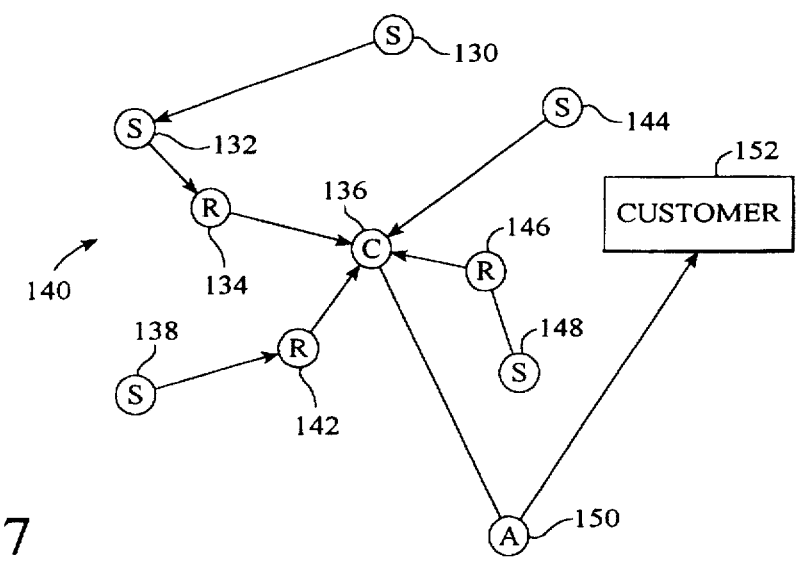
FIG. 7 shows a network of connected measurement stations of FIG. 6.

FIG. 7 is a depiction of a network (140) of a plurality of measurement stations (132, 130, 138, 144, 148) of FIG. 6. The network 140 also comprises a central station (136) connected to each measurement station for receiving earthquake prediction signals from each measurement station. The central station also sends to each measurement station a control signal for triggering its performance.

A data processing center (150) is connected to the central station (136) for processing all incoming information from each measurement station. As a result, the customer 152 accessing the data processing center (D) is able to determine the epicenter location, the magnitude, and the time of occurrence of the forthcoming earthquake.

In the preferred embodiment, the network of measurement stations comprises at least five measurement stations for generating at least five earthquake prediction signals. At least five prediction signals allow one to define the epicenter location, the energetic class, and the time of the forthcoming earthquake.

To predict an earthquake, the distance between any two measurement stations should be about 50 kilometers.

The network (140) of measurement stations (130, 132, 138, 144, 148) for earthquake prediction can also include a plurality of relay stations (134, 142, 146), each relay station connecting one measurement station and the central station (136). Each relay station transmits one earthquake prediction signal (DPS) generated by one measurement station to the central station, and also transmits the control signal from central station to one measurement station.

Figure 8:
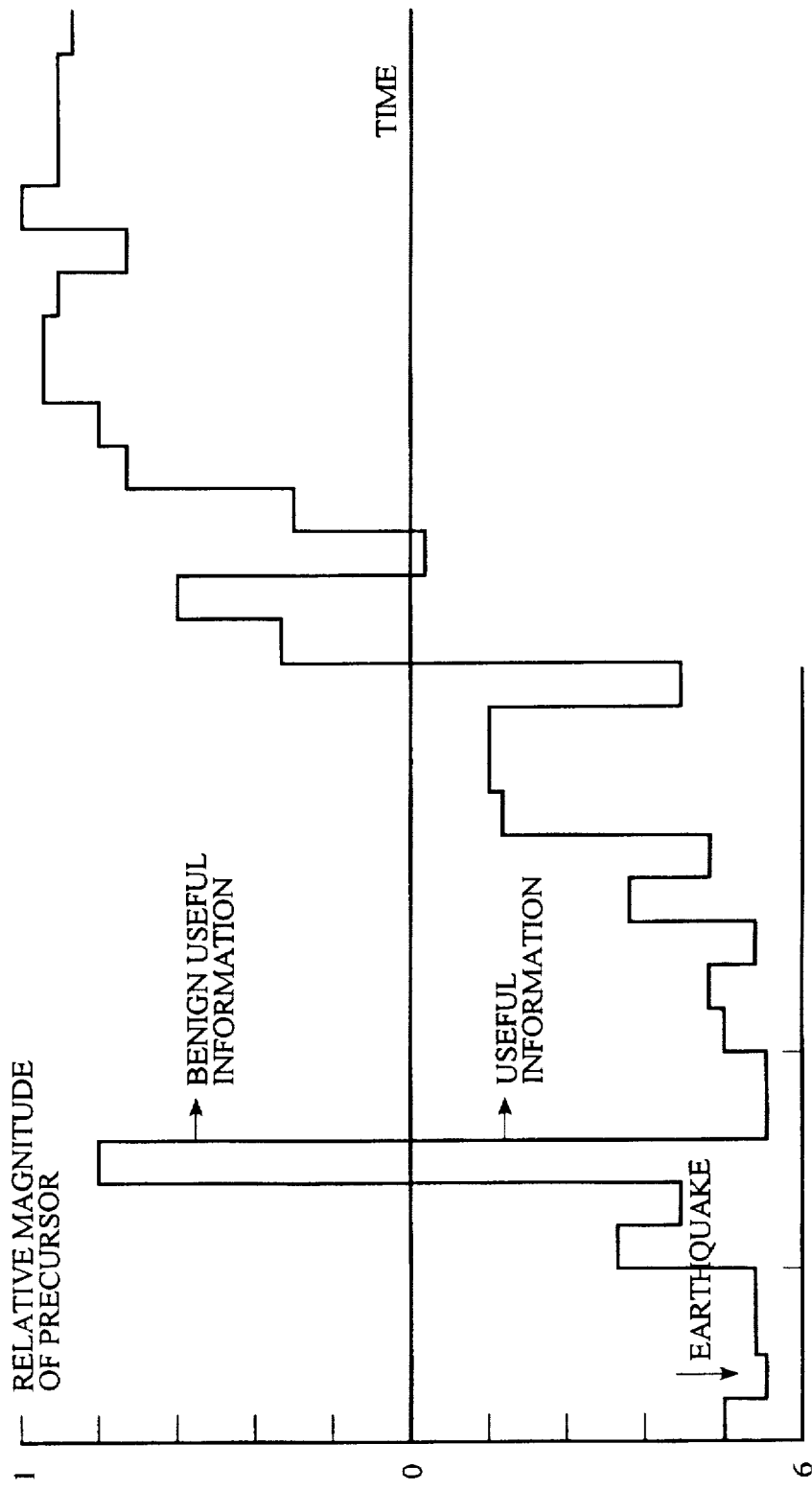
FIG. 8 is an illustration of the experimental results for predicting an earthquake using the measurement station of the present invention.

FIG. 8 illustrates the experimental results for predicting an earthquake in the area of Almalyk in Uzbekistan. As it is seen from FIG. 8, the commencement of an earthquake can be predicted quite precisely using the disclosed above network of measurement stations.

The present invention also embodies a method of forecasting earthquakes as a function of correlation K between the vertical component of the electrical field gradient $U_h$, and the temperature changes of the soil $T_s$. The method comprises the following steps. The first step is a step of positioning a pair of electrodes beneath the earth surface at a first position $P_1$ with coordinates $(X_1, Y_1, Z_1)$ for measuring the vertical component $U_h$ of the electrical field gradient associated with the mechanical movement of the soil water. The second step is positioning a temperature sensor at the earth surface at the position $P_1$ for measuring the temperature changes $T_s$ of the soil.

The next step is a step of calculating a correlation factor $K_1$ between variation of the vertical component of the electrical field gradient $U_h$ and variation of the temperature changes of the soil $T_s$ due to the electrokinetical effect associated with the vertical movement of the soil water when the soil water evaporates at the earth surface level.

At the following step it is important to filter out the non-earthquake factors contributing to the variation of the correlation factor $K_1$. This can be done by continuously monitoring the soil water content $W_1$. After that, one can calculate a forecast parameter $F_1(K_1, \tau)$ for position $P_1$ as a function of $K_1$ and $\tau$. This can be done by summing the filtered variations of the correlation factor $K_1$ over time $\tau$ starting at the time moment $\tau=\tau_{01}$ when $K_1$ starts to become negative (the time of appearance of the precursor of the earthquake) and ending at the time moment $\tau=\tau_{m1}$ when K1 reaches minimum.

The next step is the step of calculating the parameters $A_1$ and 'b' for the position $P_1$. One should repeat all the above given steps in order to calculate (n) correlation factors ($K_1$, $K_2$, ... $K_n$), and (n) forecast parameters ($F_1$, $F_2$, ... $F_n$), for (n) positions ($P_1$, $P_2$, ... $P_n$), n is an integer. The knowledge of values of forecast parameters ($F_1$, $F_2$, ... $F_n$), parameters ($A_1$, $A_2$, ... $A_n$), and parameter 'B' extrapolated for large earthquake magnitudes (d) allows one to predict the time of occurrence, magnitude, and epicenter of the forthcoming earthquake by solving the following system of equations:

$$F_1 = A_1 * 10^d / r_1^B; \qquad (11)$$

$$F_2 = A_2 * 10^d / r_2^B; \qquad (12)$$

$$F_n = A_n * 10^d / r_n^B. \qquad (13)$$

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. An apparatus for predicting an earthquake, said apparatus comprising:

a sensing circuit for measuring the electrical, temperature, and humidity parameters of soil and for generating a sensing signal, wherein said sensing signal is related to the measured electrical, temperature, and humidity parameters of the soil;

a processing circuit conductively connected to said sensing circuit for receiving said sensing signal, for processing said sensing signal, and for generating a prediction signal;

a receiving circuit conductively connected to said processing circuit for receiving a command signal from a remotely located central station to initiate the transmission of said prediction signal; and a transmitting circuit conductively connected to said processing circuit for transmitting said prediction signal to a customer;

whereby said prediction signal informs the customer about the forthcoming earthquake.

2. The apparatus of claim 1; wherein said sensing circuit further includes:

a water humidity sensor for monitoring the soil humidity changes W;

a temperature sensor for measuring the changes in the temperature $T_s$ of the soil surface; and a pair of electrodes for measuring the changes in the vertical component $U_h$ of the electrical field gradient associated with the mechanical movement of the soil water, a first electrode being located at a certain depth $h_0$ beneath an earth surface, wherein said depth $h_0$ is determined by the depth of the quartz containing hard rock layer, and a second electrode being located beneath an earth surface at a certain depth $h_1$ substantially close to an earth surface;

wherein K is a correlation factor between the changes in the vertical component of the electrical field gradient $U_h$ and the changes in the temperature of the soil $T_s$ due to the electrokinetical effect associated with the vertical movement of the soil water when the soil water evaporates at the earth surface level;

and wherein a forecast parameter F(K, $\tau$) for said position P is a function of said correlation factor K and a time $\tau$, and wherein said forecast parameter F (K, $\tau$) can be calculated by summing the filtered variations of said correlation factor K over time $\tau$ starting at the time moment $\tau=\tau_0$ when said factor K starts to become negative and ending at the time moment $\tau=\tau_m$ when said factor K reaches the minimum value;

and wherein said sensing signal is related to said soil humidity changes W, to said changes in the temperature $T_s$ of the soil surface, and to said changes in the vertical component $U_h$ of the electrical field gradient associated with the mechanical movement of the soil water;

and wherein said prediction signal is related to said forecast parameter F.

3. The apparatus of claim 2; wherein said first electrode is located at the depth $h_0$ substantially equal to 1 meter beneath an earth surface.

4. The apparatus of claim 2; wherein said second electrode is located at the depth $h_1$ substantially equal to (0.1–0.3) meters beneath an earth surface.

5. The apparatus of claim 1; wherein said processing circuit further comprises:

a measurement and control circuit for receiving said sensing signal, for processing said sensing signal, and for generating a prediction signal (PS) to be transmitted;

and a battery circuit connected to said measurement and control circuit for supplying energy to said measurement and control circuit.

6. The apparatus of claim 5, wherein said battery circuit further includes:

a solar panel being exposed to the light intensity for transforming the light energy into the electrical energy; and a storage battery for storing the electrical energy generated by said solar panel and for supplying said processing circuit with electrical energy.

7. The apparatus of claim 5 further including:

a feeding and junction circuit for routing a functional control signal received from said central station and for monitoring of said apparatus.

8. A network of measurement stations for earthquake prediction, said network comprising:

a central station for generating a command signal; wherein said central station is located outside the area of measurement;

a plurality of measurement stations, each said station generating an earthquake prediction signal at the place of said station location; wherein each said measurement station includes an apparatus comprising:

a sensing circuit for measuring the electrical, temperature, and humidity parameters of soil and for generating a sensing signal, wherein said sensing signal is related to the measured electrical, temperature, and humidity parameters of the soil;

a processing circuit conductively connected to said sensing circuit for receiving said sensing signal, for processing said sensing signal, and for generating a prediction signal;

a receiving circuit conductively connected to said processing circuit for receiving said command signal from said remotely located central station to initiate the transmission of said prediction signal; and a transmitting circuit conductively connected to said processing circuit for transmitting said prediction signal to said remotely located central station;

and a data processing center connected to said central station for processing each prediction signal generated by each measurement station and for determination the epicenter location, the magnitude, and the time of occurrence of the forthcoming earthquake.

9. The network of measurement stations for earthquake prediction of claim 8, wherein said plurality of measurement stations further comprises:

at least five measurement stations for generating at least five earthquake prediction signals for defining the epicenter location of the forthcoming earthquake.

10. The network of measurement stations for earthquake prediction of claim 8 further comprising:

a plurality of relay stations, each said relay station connecting one said measurement station and said central station for transmitting one said earthquake prediction signal from said measurement station to said central station, and for transmitting the command signal from said central station to said measurement station.

11. A method of forecasting earthquakes as a function of correlation K between the changes in the vertical component of the electrical field gradient $U_h$ and the changes in the temperature of the soil surface $T_s$, said method comprising the steps of:

(a) positioning a pair of electrodes beneath the earth surface at a first position $P_1$ with coordinates $(X_1, Y_1, Z_1)$;

(b) positioning a temperature sensor for measuring the changes in the temperature $T_s$ of the soil surface for said position $P_1$;

(c) calculating a correlation factor $K_1$ between variation of the vertical component of the electrical field gradient $U_h$ and variation of the temperature changes of the soil $T_s$ due to the electrokinetical effect associated with the vertical movement of the soil water when the soil water evaporates at the earth surface level for said first position $P_1$;

(d) positioning a water humidity sensor for monitoring the soil humidity content $W_1$ for said position $P_1$ in order to filter out variation of the correlation factor $K_1$ due to changes of the soil humidity associated with the non-earthquake factors;

(e) calculating a forecast parameter $F_1(K_1, \tau)$ for said position $P_1$ as a function of $K_1$ and $\tau$ by summing the filtered variations of said correlation factor $K_1$ over time $\tau$ starting at the time moment $\tau=\tau_{o1}$ when $K_1$ starts to become negative and ending at the time moment $\tau=\tau_{m1}$ when $K_1$ reaches the minimum;

(f) calculating parameters $B_1$ and $A_1$ for the position $P_1$, by averaging the forecast parameter $F_1$ over substantial number of prior earthquakes that occurred at position $P_1$, wherein parameter $B_1$ is related to a location of the epicenter of a forthcoming earthquake, and wherein $A_1$ is related to the physical properties of the local place of position $P_1$;

(g) repeating the steps (c)–(f) for calculating (n–1) correlation factors $(K_2, \ldots K_n)$, and (n–1) forecast parameters $(F_2(K_2, \tau), \ldots F_n(K_n, \tau))$, and parameters $(A_2, \ldots A_n; B_2, \ldots B_n)$ for (n–1) positions $P_2, \ldots P_n$, b being an integer;

and (h) predicting the time of occurrence, magnitude, and epicenter of the forthcoming earthquake by using 'n' values $(F_1(K_1, \tau), F_2(K_2, \tau), \ldots F_n(K_n, \tau))$ of the forecast parameters extrapolated for large earthquake magnitudes.

12. The method of claim 11; wherein the forecast parameters are assumed to have the following representations:

$$F_1 = A_1 * 10^d / r_1^B;$$

$$F_2 = A_2 * 10^d / r_2^B;$$

$$F_3 = A_2 * 10^d / r_3^B;$$

$$F_n = A_n * 10^d / r_n^B;$$

wherein $A_1$ and $r_1$ are related to a location of the first place of measurement $P_1$; wherein $A_2$ and $r_2$ are related to a location of the second place of measurement $P_2$; wherein $A_3$ and $r_3$ are related to a location of the third place of measurement $P_3$; and wherein $A_n$ and $r_n$ are related to a location of the n-th place of measurement $P_n$; and wherein parameter 'd' is related to the magnitude of the forthcoming earthquake; and wherein parameter 'b' is related to a particular theoretical model for the elastic energy stored in the forthcoming earthquake.

13. The method of claim 12; wherein in case of strong earthquakes the parameter $K_1$ is substituted for parameter $K_2 = U_h/T_s$.

14. The method of claim 11, wherein the step of predicting the time of occurrence of the forthcoming earthquake further includes the steps of:

calculating the average correlation factor $<K>$;

calculating the average period of time $\tau_a$ between the moment of time $\tau_m$ when the average correlation factor $<K>$ has its minimum and the start of the earthquake;

calculating the function $\tau_a(d)$; and extrapolating the dependance $\tau_a(d)$ for large d that corresponds to earthquakes with the large magnitudes, wherein $\tau_a(d \to \infty)$ is the time of occurrence of a forthcoming earthquake.

15. The method of claim 11, wherein the step of predicting the location of the forthcoming earthquake further includes the steps of:

providing a network of at least five measurement stations for earthquake prediction; and generating at least five earthquake prediction signals for definition of the epicenter location of a forthcoming earthquake.

16. The method of claim 11, wherein the step of predicting the magnitude of the forthcoming earthquake further includes the step of:

calculating the magnitude of the forthcoming earthquake as a function of the parameter d.

* * * * *